United States Patent

[11] 3,630,332

| [72] | Inventor | John H. Price |
| | | 163 Frey Lane, Belleville, Ill. 62221 |
| [21] | Appl. No. | 854,708 |
| [22] | Filed | Sept. 2, 1969 |
| [45] | Patented | Dec. 28, 1971 |

[54] TRANSVERSE FRICTION CLUTCH
10 Claims, 3 Drawing Figs.

[52] U.S. Cl..................................................... 192/77,
188/336, 192/99 B, 192/111 T
[51] Int. Cl.......................................................F16d 13/14,
F16d 13/75
[50] Field of Search............................................ 192/77, 78,
99 B, 111 T; 188/78.7, 336

[56] References Cited
UNITED STATES PATENTS
1,667,175  4/1928  Timbs........................... 192/77

| 1,873,479 | 8/1932 | Rauch | 192/77 |
| 1,961,860 | 6/1934 | Kohr | 188/78.7 X |
| 1,978,723 | 10/1934 | Rosner | 188/78.7 |
| 2,167,935 | 8/1939 | Borden | 188/78.7 |
| 2,530,460 | 11/1950 | Grundon | 192/77 X |
| 2,904,147 | 9/1959 | Alwood | 192/78 X |

*Primary Examiner*—Allan D. Hermann
*Attorney*—John D. Pope, III

ABSTRACT: A C-shaped clutch friction means includes at least two arcuate bands having high-friction linings mounted on their outer arcuate surfaces. The bands each have a first end adapted to pivotally receive a link and a second end having a bolt-receiving bracket. The bands are joined together at their second ends by a bolt which threadably engages the bolt-receiving brackets so that the bands are free to swivel about the longitudinal axis of the bolt.

INVENTOR
JOHN H. PRICE
BY
ATTORNEY

TRANSVERSE FRICTION CLUTCH

This invention relates to clutches and more specifically to a clutch friction means for use in clutches.

Many types of cranes and other excavating equipment commonly use clutches for transferring power to their various components. For example, swing clutches are used to swing the cab about a vertical axis. Other clutches are used for actuating and deactuating the various movable booms and for winding and unwinding cables. Clutches presently used in this type of equipment usually include a clutch plate which is rotatably driven by a power supply. Surrounding the clutch plate is a rotatable circular flange adapted to rotate independently of the clutch plate. Mounted on the clutch plate is a C-shaped clutch friction having a high friction material on its outer arcuate surface. The position of the clutch friction is such that its friction material faces the inner arcuate surface of the rotatable flange surrounding the clutch plate. The clutch friction has one end, commonly referred to as the dead end, pivotally mounted directly to the clutch plate. The other end of the clutch friction, commonly referred to as the live end, is pivotally connected to a link which in turn is pivotally connected to the clutch plate. This link permits swinging movement of the live end of the clutch friction, so that the friction material can be moved in and out of contact with the inner arcuate surface of the flange. When the friction material of the clutch friction engages the flange the rotation of the clutch plate is transferred to the flange.

The clutch friction of this type of clutch has heretofore been constructed from one unitary C-shaped band of material. Because only the live end of the friction swings into frictional contact with the flange during actuation of the clutch, the major part of the wearing takes place adjacent the live end of the clutch friction. This causes the friction material on the outside of the clutch friction to wear out unevenly and quickly. Furthermore, because the pressure is applied unevenly around the outer surface of the clutch friction, there is usually a loud squeaking sound during the engaging and disengaging of the clutch. This squeaking sound is quite loud and very irritating to construction workers and neighboring land owners.

The clutch friction means of this invention is C-shaped as in previous devices, but is is divided into two or more pieces which are swivelly connected together. The pivotal connection between the bands is provided by a bolt which has threads on its opposite ends for threadably engaging each of the bands. The threads on the bolt are opposite in direction so that rotation of the bolt causes the bands to move toward and away from one another. This provides a means for adjusting the distance between the clutch friction means and the flange which surrounds it.

The swivel connection between the bands lends flexibility to the clutch friction means, thereby permitting it to seat evenly against the flange in response to pressure from the live end. This flexibility also distributes pressure between the clutch friction means and the flange around a greater portion of the circumference of the clutch friction means than with previous one-piece frictions. Because the pressure is exerted more evenly and over a greater surface of the clutch friction means, the friction material wears more evenly and lasts longer. Furthermore, there is no squeaking sound during the engagement and disengagement of the clutch.

Among the several objects of the present invention may be noted the provision of a clutch friction means which wears more evenly than in previous devices; the provision of a clutch friction means which lasts longer than previous devices; the provision of a clutch friction means which can have its live end and dead end reversed; the provision of a clutch friction means which does not squeak during engagement and disengagement of the clutch; the provision of a clutch friction means which can be used in present clutches without substantial change in the clutch design; the provision of a clutch friction means which can easily be adjusted; and the provision of a clutch friction means which is economical to manufacture.

Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is an elevational view of a clutch utilizing the clutch friction means of this invention;

Corresponding reference characters indicate corresponding parts throughout the several views of the drawings.

Figure 1:
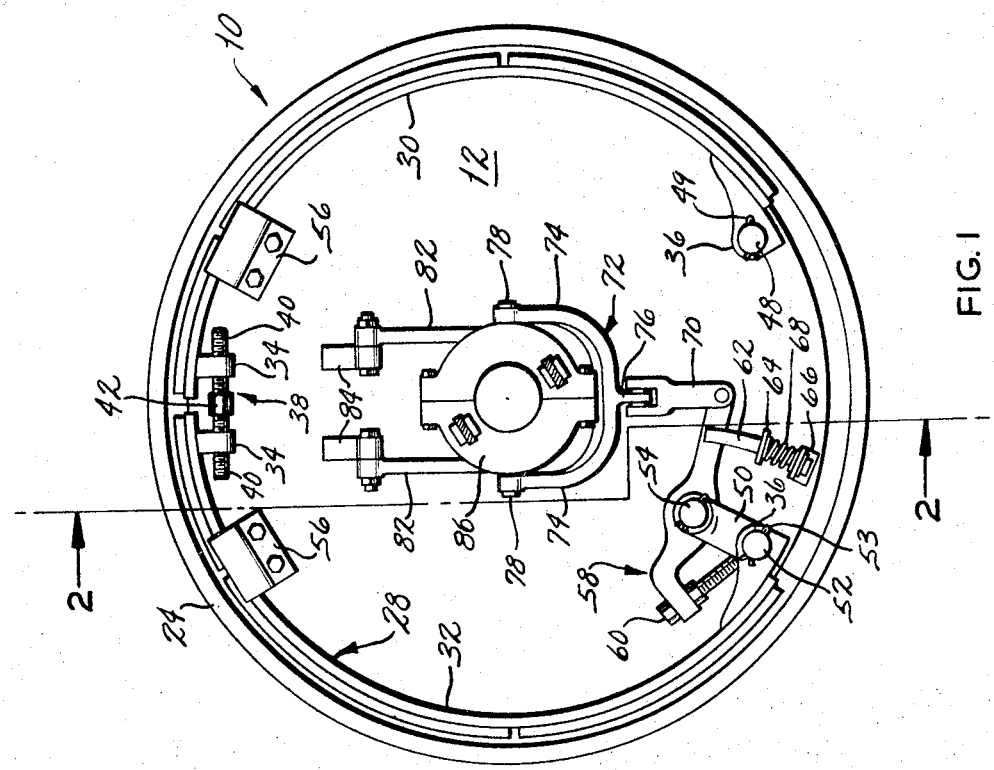

A circular clutch 10 is of the type commonly used in cranes, derricks and other types of trenching and excavating equipment. A clutch plate 12 is rigidly connected to a drive shaft 14 which is rotatably driven by a prime mover (not shown). On the opposite side of clutch plate 12 from drive shaft 14 is a hub 16 which is axially aligned with drive shaft 14. Rotatably mounted around drive shaft 14 is an output shaft 18 having a pulley 20 keyed thereon. Rigidly connected to output shaft 18 is an output wheel 22 which includes a circular flange 24 surrounding the outer peripheral edge of clutch plate 12. Output wheel 22 and output shaft 18 are mounted on a plurality of roller bearings 26 which permit them to rotate independently of clutch plate 12.

Mounted on clutch plate 12 is a C-shaped clutch friction means 28 which is comprised of two arcuate bands 30, 32, of equal length. Attached to the outer arcuate surfaces of bands 30, 32, are a plurality of pieces of friction material 33 having a high coefficient of friction. This material is of the type conventionally used to line clutches and brakes. Each of bands 30, 32, has at one of its ends a bolt-receiving bracket 34 and at the other of its ends an anchoring bracket 36. A bolt 38 threadably engages each bolt-receiving bracket 34, thereby joining bands 30, 32, to form C-shaped friction 28. Bolt 38 includes threaded portions 40 on its opposite ends and a head 42 at its approximate longitudinal center. Threaded portions 40 are opposite in direction so that rotation of bolt 38 causes bolt-receiving brackets 34 to move towards and away from one another. Thus the circumference of friction 28 can be adjusted merely by twisting bolt 38. The longitudinal axis of bolt 38 is parallel to a line tangent to the arcuate surfaces of bands 30, 32. There are no nuts locking bolt 38 in bolt-receiving brackets 34 and therefore bands 30, 32, are free to swivel about the longitudinal axis of bolt 38.

Two types of flexibility are achieved by the fact that bolt 38 joins bands 30, 32. The swivel action about the longitudinal axis of bolt 38 permits clutch friction means 28 to snugly conform to the inner arcuate surface of flange 24 when pressed in that direction. Also, since bolt 38 is the only means for connecting bands 30, 32, a slight amount of flexion is permitted about an axis normal to clutch plate 12. A small space is provided between the adjacent ends of bands 30, 32, to permit this flexion to take place.

Anchoring brackets 36 include two parallel plates 44 each having an aperture 46 therein. Apertures 46 of each anchoring bracket 36 are aligned above one another. Anchoring bracket 36 of band 30 is secured to a dead end post 48 which is rigidly connected to clutch plate 12. Dead end post 48 extends through apertures 46 of anchoring bracket 36 and is held in place by means of a cotter pin 49. This end of clutch friction means 28 is commonly referred to as the dead end because it is held against any other movement with respect to clutch plate 12 other than pivotal movement about dead end post 48.

Anchoring bracket 36 on band 32 is pivotally connected to a link 50 by means of a pin 52 which extends through aperture 46 of anchoring bracket 36 where it is held by cotter pin 53. The opposite end of link 50 is pivotally mounted on a live end post 54 which is rigidly connected to clutch plate 12. This end of friction means 28 is commonly referred to as the live end because link 50 permits it to swing around live end post 54. A pair of holddown brackets 56 are rigidly connected to clutch plate 12 and engage clutch friction means 28 to prevent its movement away from clutch plate 12. When clutch friction means 28 is mounted to clutch plate 12 in this manner the high friction material faces the inner arcuate surface of flanges 24 on output wheel 22.

A pivot arm 58 is pivotally connected to live end post 54 and includes an adjustment bolt 60 threaded through one of its ends. Adjustment bolt 60 interconnects pivot arm 58 with pin 52 so that movement of pivot arm 58 causes the live end of friction means 28 to swing in an arc around live end post 54. Adjacent the opposite end of pivot arm 58 is a slide arm 62 having a stop 64 thereon. Slide arm 62 slidably extends through a bracket 66 which is rigidly mounted to clutch plate 12. A spring 68 surrounds slide arm 62 and is compressed between stop 64 and bracket 66 so as to bias pivot arm 58 in a counterclockwise direction. Pivotally connected to the end of pivot arm 58 located opposite from bolt 60 is a middle link 70. The pivotal axis between middle link 70 and pivot arm 58 is parallel to live end post 54 and perpendicular to clutch plate 12. A toggle yoke 72 includes yoke arms 74 and a stem 76 which is in pivotal connection with middle link 70. Yoke arms 74 are pivotally connected to pins 78 located on the opposite sides of a first circular slide 80. First circular slide 80 is slidably mounted over hub 16 and is adapted to slide toward and away from clutch plate 12. A pair of toggle links 82 are each pivotally connected at one end to a pin 78 and at the other end to a bracket 84 rigidly connected to clutch plate 12. A second circular slide 86 is also slidably mounted over hub 16. It is separated from first circular slide 80 by a bearing ring 88 so that the two circular slides 80, 86, may rotate independently of one another. Operatively connected to second slide 86 is a linkage mechanism 90 which leads to the control levers (not shown) adjacent the operator's station.

Figure 2:
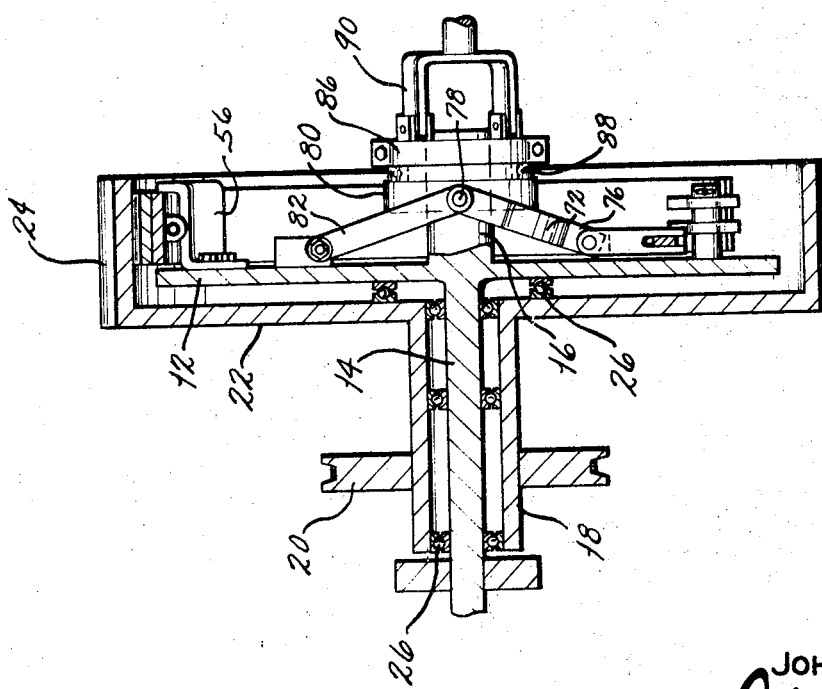
FIG. 2 is a sectional view taken along line 2—2 of FIG. 1.
Figure 3:
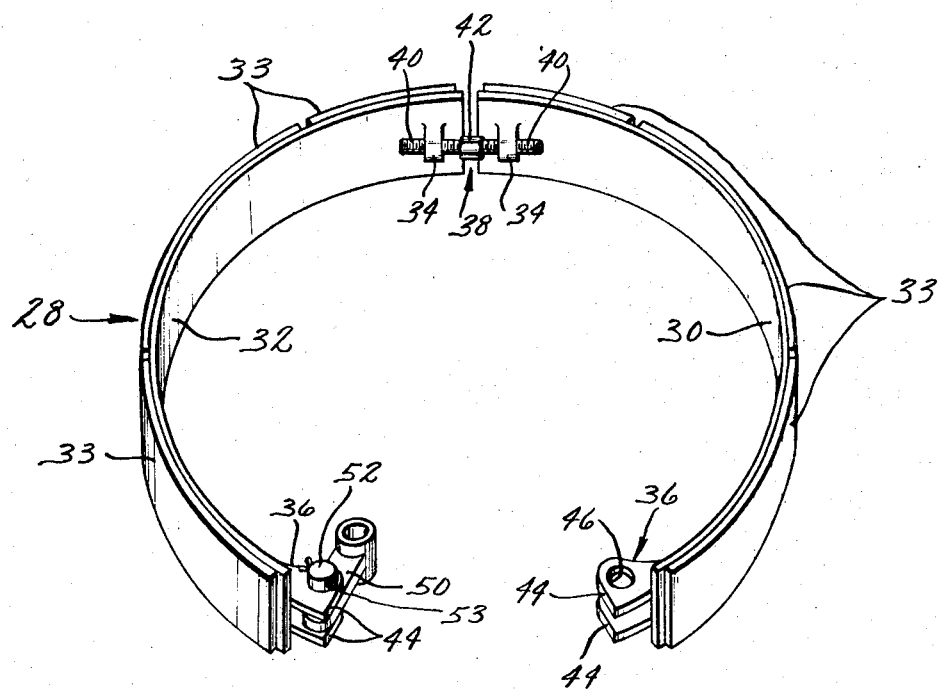
FIG. 3 is a perspective view of the clutch friction means.

When clutch 10 is in a disengaged position, drive shaft 14, clutch plate 12, clutch friction means 28, first circular slide 80, and the links connected thereto are all rotating. Second circular slide 86, linkage mechanism 90, output wheel 22 and flange 24 are stationary. First and second circular slides 80, 86, are positioned a substantial distance away from clutch plate 12 as shown in FIG. 2. To engage clutch 10 the operator manipulates the controls adjacent the operator's station, thereby causing linkage mechanism 90 to press second circular slide 86 toward clutch plate 12. This causes first circular slide 80 to move toward clutch plate 12, thereby causing toggle yoke 72 and toggle links 82 to move towards alignment. As toggle yoke 72 and toggle links 82 approach an angle of 180°, stem 76 of toggle yoke 72 is moved away from hub 16. This movement of stem 76 is transferred through middle link 70 to pivot arm 58, thereby imparting clockwise swinging movement thereto. Rotation of pivot arm 58 in a clockwise direction causes bolt 60 to pull the live end of clutch friction means 28 in an upward direction as viewed in FIG. 1. That is, the live end of clutch friction means 28 swings in a clockwise direction around live end post 54. This movement of clutch friction means 28 brings the high friction materials on the outer arcuate surface of clutch friction means 28 into frictional engagement with the inner arcuate surface of flange 24, thereby transferring the rotational movement of clutch plate 12 to output wheel 22.

As clutch friction means 28 is pressed into engagement with flange 24, swivel connection bolt 38 between bands 30, 32, lends flexibility to clutch friction means 28, thereby permitting high friction material 33 to seat smoothly and evenly against the inner arcuate surface of flange 24. As in previous clutches of this type the greatest pressure is adjacent the live end of clutch friction means 28 and the least pressure is adjacent the dead end of clutch friction means 28. However, because the clutch friction means is broken into two separate pieces there is greater flexibility than in previous devices, and therefore the pressure in the live end is transferred a greater distance around the clutch friction means. For this reason a greater surface of frictional material engages flange 24 than in previous devices. Because of this smooth application of pressure the frictional materials do not wear as fast as before and there is seldom any squeaking during engagement and disengagement of the clutch. The threaded portions 40 of bolt 38 not only lend flexibility to the clutch friction means but also permit easy adjustment of the distance between the frictional materials and the inner surface of flange 24. Rotation of bolt 38 expands or contracts the circumference of clutch friction means 28, thereby decreasing or increasing, respectively, the distance between the frictional materials and flange 24.

After extended use, clutch friction means 28 can be flopped over so that band 30 serves as the live end and band 32 serves as the dead end of the clutch friction means. This is done merely by connecting bracket 36 of band 30 to link 50 and by connecting bracket 36 of band 32 to dead end post 48.

The clutch friction means of this invention can be divided into more than the two bands shown in the drawings. Additional flexibility can be obtained by dividing it into three, four, or more separate bands joined by securing means which permit swiveling.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Clutch friction means for a friction clutch having a dead end pivot post and actuating means for moving said clutch friction means, said clutch friction means comprising at least two symmetrical arcuate bands having friction linings mounted on their outer arcuate surfaces, one end of each said band being joined together by adjustable connecting means, the opposite end of each said band being a free end thereof and having identical anchor means secured thereto such that either one of said anchor means is adapted to engage said dead end pivot post, the remaining anchor means engaging said actuating means.

2. The clutch of claim 1 wherein said anchor means comprises at least one plate having an edge thereof secured to said band portion, said plate including an aperture formed to embrace said dead end pivot post.

3. The clutch of claim 2 wherein said actuating means includes a pivot rod formed to engage said aperture to connect one of the free ends of said band portion to said actuating means.

4. A friction clutch comprising a clutch plate rotatably driven by a prime mover, said clutch plate having a dead end pivot post and friction clutch actuating means, a drum member having a circular flange surrounding said clutch plate and being freely rotatable about said clutch plate, a C-shaped clutch friction means provided on said clutch plate, said friction means including friction material on its outer arcuate surface, said friction material facing the inner arcuate surface of said circular flange, said clutch friction means having one free end pivotally anchored to said dead end pivot and another free end pivotally anchored to said actuating means, said actuating means urging said friction means toward said circular flange for frictional engagement therewith to transmit rotational movement of said clutch plate to said drum member, said clutch friction means being reversible and further comprising symmetrical arcuate band portions supporting said friction material, said band portions having identical anchor means provided at the free ends thereof for respective pivotal engagement with said dead end pivot post and said friction clutch engaging means, either of said anchor means being engageable with the dead end pivot post of said clutch plate and said friction clutch actuating means.

5. The clutch of claim 4 wherein said clutch friction means are formed of at least two distinct arcuate band portions joined together intermediate said free ends by adjustable connecting means.

6. The clutch of claim 5 wherein said band portions include bolt receiving brackets, said adjustable connecting means comprising a bolt threadably engaging said brackets such that said band portions are joined together in pivotal relationship with respect to said bolt, thereby permitting one said band portion to swivel with respect to the other said band portion.

7. The clutch of claim 6 wherein the pivotal axis between said bands is parallel to a line tangent to the arcuate surfaces of said bands.

8. The clutch of claim 6 wherein said bolt includes first and second threaded portions, said first threaded portion engaging one of said bolt-receiving brackets and second portion engaging the other of said bolt-receiving brackets; said threaded portions being threaded in opposite directions so that rotation of said bolt causes movement of said bands towards and away from one another.

9. The clutch of claim 4 wherein said anchor means comprises at least one plate having an edge thereof secured to said band portion, said plate including an aperture formed to embrace said dead end pivot post.

10. The clutch of claim 9 wherein said actuating means includes a pivot rod formed to engage said aperture to connect one of the free ends of said band portion to said actuating means.

* * * * *